Dec. 27, 1966 G. DORNBERGER ETAL 3,295,057

VARIABLE RESISTANCE NETWORK HAVING A CONSTANT STRAY CAPACITANCE

Filed May 8, 1963 2 Sheets-Sheet 1

INVENTORS
G. DORNBERGER
W. M. SMITH
By [signature]
ATTORNEY

Dec. 27, 1966 G. DORNBERGER ET AL 3,295,057

VARIABLE RESISTANCE NETWORK HAVING A CONSTANT STRAY CAPACITANCE

Filed May 8, 1963 2 Sheets-Sheet 2

United States Patent Office 3,295,057 Patented Dec. 27, 1966

3,295,057

VARIABLE RESISTANCE NETWORK HAVING A CONSTANT STRAY CAPACITANCE

Georg Dornberger, Union, and William M. Smith, Jersey City, N.J., assignors to Western Electric Company, Incorporated, New York, N.Y., a corporation of New York Filed May 8, 1963, Ser. No. 278,936
8 Claims. (Cl. 324—60)

This invention relates to A.-C. measuring circuitry and, more particularly, to variable resistance networks applicable for use therewith.

Calibrated, variable resistance or conductance elements presently available, such as potentiometers, rheostats, or specialized voltage dividers, generally have distributed stray capacitances which disadvantageously vary as a function of the primary resistance parameter. This stray capacitance unfortunately is not constant, but normally varies appreciably as a function of the resistance. As a result, if a resistor R, for example is considered connected in parallel with its distributed stray capacitance C, the effective resistance $R_E$ at any frequency $f$ is:

$$R_E=\frac{R}{1+\omega^2C^2R^2}$$

where $\omega=2\pi F$.

The effective capacitance may then be defined as:

$$C_E=\frac{R^2\omega C}{1+R^2\omega^2C^2}$$

From these equations it is readily seen that if the variable resistor is set for some specific value of resistance, $R_1$, the effective value of resistance as a result of the parallel capacitance associated therewith is less than $R_1$ by a factor which is dependent upon both the value of C (the capacitance associated with the setting for $R_1$) and on the frequency. It is thus important in many circuit applications to take the distributed stray capacitance associated with resistors into account. This is readily done for fixed resistors, where the stray capacitance is constant. For continuously variable resistors, however, the techniques employed heretofore have not adequately provided a solution to this problem.

This is especially true in alternating current measuring circuits, such as A.-C. bridges, for example, where stray capacitance variations in any of the variable resistance bridge elements can introduce errors which may seriously affect the accuracy of the measurements. Such errors may become intolerable when a high degree of precision is required and/or the measuring frequency is increased.

In a number of commercially available A.-C. bridges, no circuitry is provided to compensate for stray capacitance variations in the variable resistance elements or standards of the bridge.

In some bridge circuits, compensation for variable stray capacitance has involved connecting the variable resistor in series with a fixed resistor. If the resistance of the fixed resistor is made 9 times that of the variable resistor, for example, there is a reduction of about a factor of 10 in the effect of the capacitance variation. There is a limitation, however, on how far this reduction can be carried before the operating range of the variable resistor is no longer practical.

Since the above techniques afford only partial compensation for stray capacitance variations, the error in the effective resistance remaining is still often a seriously disadvantageous factor, especially when high frequency measurements, variable frequency measurements, and/or very close resistance measuring limits are dictated in a given application.

Accordingly, it is an object of this invention to maintain substantially constant the distributed stray capacitance which normally varies with resistance in variable resistors.

It is a more specific object of this invention to compensate for the variable stray capacitance normally associated with the variable resistance or conductance standards employed in A.-C. bridge measuring circuits and the like.

The invention as embodied herein does not eliminate the stray capacitance normally associated with variable resistors, but rather, makes the capacitance substantially constant, where required, for specific circuit requirements.

In one illustrative embodiment and application, a calibrated, variable resistance network exhibiting a substantially constant value of capacitance across its terminals, is incorporated in an A.-C. bridge. Specifically, the network is utilized as a calibrated resistance standard.

The network is important for several basic reasons. First, a "true" null condition can only be obtained when the resistance normally associated with the unknown reactive element may be balanced out without affecting the bridge reactance. Stated another way, any change in an uncompensated resistance standard would normally effect an unbalance in bridge capacitance. With a change in capacitance, the true resistance and capacitance values of the unknown being measured may then only be determined by calculations which take into account both the variable capacitance associated with the variable, uncompensated resistance standard and the measuring frequency. Secondly, with a compensated, variable resistance network standard, a "true" null condition may be more readily and accurately achieved with a minimum number of alternate adjustments between the capacitance and resistance standards.

In accordance with one specific illustrative embodiment, the variable resistance network comprises a resistance element having uniformly distributed resistance, a movable contact arm or slide wire associated therewith, and a conductive strap or conductor connecting the two terminal ends of the resistance element. A variable value of resistance appears between the common strap and the movable contact. Stated more precisely, the effective value of resistance at any setting of the movable contact is determined by the resultant parallel combination of the two resistances established between the movable contact and each of the two end terminals of the resistance element, respectively.

Concomitantly and very importantly, the respective capacitances established between the movable contact and each end terminal of the resistance element change in equal and opposite amounts as the position of the movable contact is changed. As a result, the sum of these parallel capacitances will advantageously remain substantially constant, thereby resulting in a constant net value of distributed stray capacitance across the network terminals over the operating range of resistance. This in turn reduces the variation of effective resistance $R_E$ as a function of frequency as indicated by the first of the two above-cited equations.

In accordance with still another illustrative embodiment of the invention, the variable resistance network takes the form of two variable resistance elements connected in parallel. The movable contact arms associated with each resistance element are moved by the same amount but in opposite directions, such as in response to a common lead screw, for example. In operation, if the resistance of one resistance element is increased, the stray capacitance between the movable contact and the ungrounded end of that resistance element decreases, whereas the resistance of the other element decreases and the stray capacitance associated therewith increases by respectively corresponding amounts. As a result, the net value of stray capacitance across the terminals of this network likewise remains substantially constant as the resistance is varied. A variation of this embodiment involves a unique form of electrical cross-connection which allows both contact arms to move in tandem in the same direction.

These and other objects and advantages of this invention will become more fully understood from a consideration of the following description, together with the accompanying drawings, in which.

Figure 1:
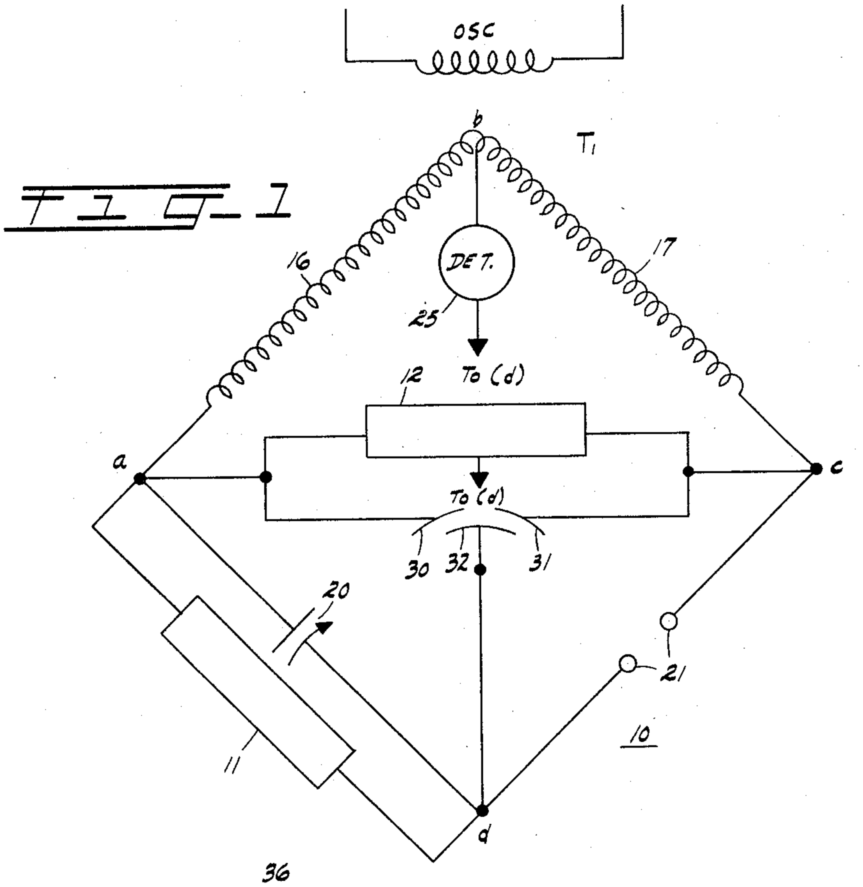
FIG. 1 depicts a hybrid transformer type A.-C. bridge circuit incorporating two variable resistance networks embodying principles of the invention for facilitating initial zero balance and thereafter attaining a rapid and accurate "true" voltage null condition.

Referring now more particularly to the drawings, FIG. 1 depicts one form of an A.-C. measuring bridge 10 for measuring the capacitance of capacitors, for example, and which incorporates two variable resistance networks 11 and 12, shown in block diagram form, embodying features of this invention. For purposes of illustration, the bridge is shown as a hybrid input transformer type wherein the secondary of the transformer $T_1$ is center tapped at the junction *b* of the bridge and forms two arms *a–b* and *b–c* comprised of inductive coil sections 16 and 17, respectively. The primary of transformer $T_1$ couples an alternating current signal from a source, not shown, to the bridge. It is to be understood, of course, that a number of different bridge arrangements, such as those utilizing equal resistance and capacitance arms, or ratio arms, are equally applicable for use with the compensating resistance networks embodied herein.

A standard, calibrated variable capacitor 20 is serially connected in the *a–d* bridge arm, and the unknown circuit element exhibiting capacitance to be measured is serially connected across the test terminals 21 in the *c–d* bridge arm. A suitable detector 25, such as a sensitive alternating current voltmeter, is connected across the junction points *b–d*. Two zero balance variable capacitors 30, 31, shown with a common rotor 32 (split stator, variable capacitor type) are connected between bridge junction points *a–d* and *c–d*, respectively. As thus far described, the bridge circuit is basically of conventional construction and is shown in the specific form of FIG. 1 only for purposes of illustration.

In accordance with an aspect of the invention, the variable resistance network 11, which exhibits a substantially constant value of capacitance across its terminals at a given frequency, is connected between junction points *a–d* of the bridge and serves two very useful functions. First, it balances out any resistance associated with the capacitive element to be measured. Secondly, inasmuch as the capacitance associated with network 11 remains substantially constant as the resistance is varied, it permits both accurate and rapid adjustment of the bridge to the "true" null condition.

Figure 2:
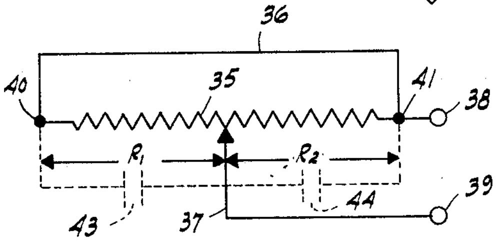
FIG. 2 depicts one embodiment of the variable resistance network shown in block diagram form in FIG. 1 in greater detail.

With particular reference to FIG. 2, it is seen that in network 11 the terminal ends of a variable resistance element 35 are connected together by a suitable conductive strap or short circuit connection 36. A conventional rheostat or potentiometer type of movable contact arm or slide wire 37 is utilized to vary the resistance across two output terminals 38 and 39. The effective value of resistance for any setting of the movable contact arm 37 is determined by the resultant parallel combination of resistances $R_1$ and $R_2$ established between the variable arm 37 and the two terminal ends 40 and 41 of the resistance element 35, respectively. As a result of this variable network arrangement, two distributed stray capacitances, represented by capacitors 43 and 44, shown in phantom, are established between the variable contact arm 37 and the terminal ends 40 and 41 of the resistance element 35, respectively. These capacitances advantageously change in value by equal and opposite amounts as the contact arm 37 is moved. Accordingly, the sum of the stray capacitances remains substantially constant, thus resulting in a constant value of capacitance across the output terminals 38 and 39 over the entire operating range of resistance.

As previously mentioned, this has not been the case with prior bridges. More specifically, when the standard resistance element 11 has been adjusted to balance out the resistance associated with the unknown capacitor to be measured heretofore, an appreciable change in capacitance, which in turn effects a change in resistance, is introduced into the standard capacitor bridge arm. As a result, the direct indicated readings of the standard capacitor and resistor are no longer indicative of the true values.

Considered more specifically, when a conventional, uncompensated bridge is adjusted for "true" balance, the resultant reading of the calibrated standard capacitance (20 in FIG. 1) reflects the fact that the uncompensated standard resistance (replacing network 11 in FIG. 1) is not actually a pure resistance. As a result, the actual resistance of the unknown component is not what is indicated on the calibrated dial of the resistance standard, but rather, is the effective value of resistance $R_E$ defined by the first of the two above-listed equations. Concomitantly, the calibrated capacitance standard in such a bridge will have some indicated reading of $C_S$, however, a part of this indicated capacitance includes the uncompensated variation of capacitance in the standard resistance arm. Accordingly, the actual capacitance of the unknown component is similarly not what is indicated on the calibrated dial of the standard capacitor, but rather, is the effective capacitance $C_E$ defined by the second of the two above-listed equations.

In this connection, it should be emphasized that while the stray capacitance of the variable standard resistor is normally only of the order of about 4 mmf. in a typical measuring bridge circuit, the error resulting therefrom becomes progressively greater as the frequency employed in making measurements increases, and as the magnitude of the capacitance under measurement decreases.

Resistance network 11, as well as the other networks embodied herein, thus serves a very important function in compensating for the variable stray capacitance associated therewith which would otherwise normally vary as a function of the resistance as determined by the setting of the contact arm.

Figure 3:
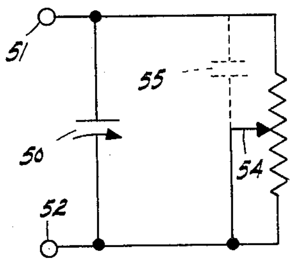
FIG. 3 depicts an alternative embodiment utilizing a variable capacitor.

FIG. 3 schematically depicts through the use of a variable capacitor 50 how the variable resistance network of FIG. 2 compensates for stray capacitance. More specifically, the net capacitance across the terminals 51 and 52 could be maintained constant by varying capacitor 50 by a predetermined amount in response to movement of the contact arm 54. Specifically, as the contact arm 54 moves, thereby changing the distributed capacitance 55, shown in phantom, the capacitance of the variable capacitor 50 should change by the same amount in the opposite direction, thereby keeping the net capacitance constant. While the use of a variable capacitor as shown in FIG. 3 could thus possibly duplicate the type of compensation effected with resistance network 11 depicted in FIG. 2, it is far more complex from the standpoint of the mechanical coupling involved and would normally be more expensive to construct.

Figure 4:
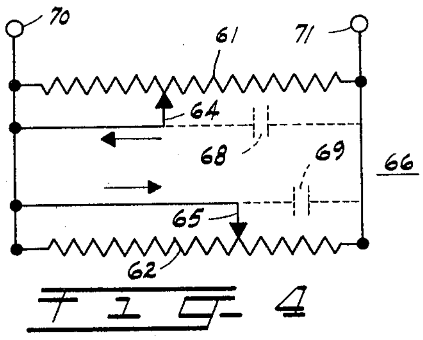
FIGS. 4 and 5 depict alternative embodiments of the variable resistance network depicted in FIG. 2.
Figure 5:
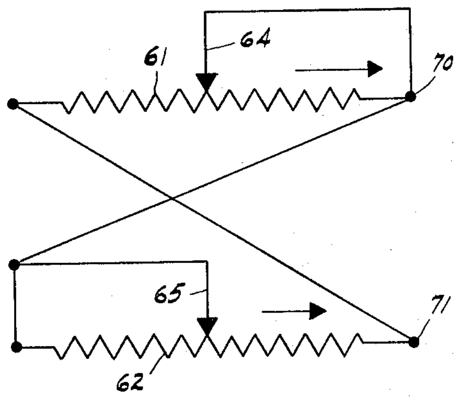

FIG. 4 depicts an alternative variable resistance network 66 wherein two identical resistance elements 61 and 62 are connected in parallel, and are adjustable by means of conventional rheostat or potentiometer type contact arms 64 and 65, respectively. The contact arms are preferably mounted on suitably coupled shafts, or a common shaft, not shown, so that as one contact arm moves in one direction, the other contact arm moves in the opposite direction, but by the same amount, as indicated by the arrows. FIG. 5 depicts an alternate arrangement of the network of FIG. 4 wherein the two contact arms may move in the same direction, as on a common shaft. This is accomplished by criss-crossing the electrical connections between the terminal ends of resistors 61 and 62 from that shown in FIG. 4.

With the arrangements of FIGS. 4 and 5, as the value of resistance across element 61 increases, the distributed stray capacitance 68, shown in phantom, decreases. Conversely, as the value of resistance across element 62 decreases, the distributed stray capacitance 69 associated therewith increases. The following circuit relationships thus exist:

$$R_E = \frac{R_{61}R_{62}}{R_{61}+R_{62}} = \frac{R_{61}R_{62}}{R_0}$$

where $R_E$ is the resulting equivalent resistance of $R_{61}$ and $R_{62}$ across terminals 70 and 71 and $R_0$ is the total resistance of both resistance elements 61 and 62.

The total equivalent capacitance $C_E$ may be simply written as $C_E = C_{68} + C_{69}$. As previously stated a typical value for $C_E$ may be in the order of 4 mmf. The last equation highlights a very important feature of the invention, namely, it verifies that a constant value of capacitance is maintained across the output terminals 70 and 71 of network 60 (as well as across the output terminals of the other networks), for any possible value of resistance within the operating range.

It is to be understood that the specific embodiments described herein are merely illustrative of the general principles of the present invention. Various other arrangements and modifications may be devised in the light of this disclosure by one skilled in the art without departing from the spirit and scope of this invention.

What is claimed is:

1. In an A.-C. bridge circuit which includes a pair of spaced test terminals in one arm for connection to an unknown reactive element to be measured and a variable standard reactance serially connected thereto in another arm, a variable resistance network for balancing the resistance associated with the unknown reactive element without changing the reactance associated with the other arms of the bridge, which network comprises:

a uniformly distributed resistance element, two output terminals connected to the standard reactance for connecting the variable resistance network in parallel with the standard reactance, one output terminal being connected to one end of the resistance element, a movable contact arm having one end contacting the resistance element and having the other end connected to the other output terminal, and a short circuit connection means in parallel with the resistance element for maintaining the distributed stray capacitance associated therewith substantially constant as the resistance of said network is varied upon movement of the contact arm along the resistance element.

2. A circuit according to claim 1 wherein said short circuit connection means comprises a second uniformly distributed resistance element having a second movable contact arm mounted thereon, said second resistance element being connected in parallel with said first resistance element, said second movable contact arm being connected both to the first movable contact arm and to one end of the parallel connected first and second resistance elements, and further including means for respectively moving said contact arms in predetermined directions relative to each other and by the same amount such that as the distributed stray capacitance associated with one of said resistance elements increases with an increase in resistance across said output terminals, the distributed stray capacitance associated with the other of said resistance elements decreases with a decrease in resistance across said output terminals, whereby the effective stray capacitance across said output terminals of said network remains substantially constant.

3. A circuit according to claim 1 further comprising zero balancing resistance means connected across two diagonally disposed bridge junctions, said resistance means being center-tapped to a common bridge junction connected to the standard reactance arm and the arm in which the unknown reactive element is to be measured.

4. An A.-C. measuring circuit comprising a balancing bridge, means for supplying an A.-C. signal across two diagonally disposed junctions of said bridge, at least one current impeding element connected serially in each of two complementary arms of said bridge, a calibrated, variable standard capacitor and a pair of spaced test terminals for measuring an unknown reactive element serially connected in two other complementary arms of said bridge, respectively, means for detecting a voltage null connected across two diametrically disposed junctions of said bridge, zero balancing resistance means connected across the bridge diagonal associated with the input signal, said resistance means being center-tapped to the bridge junction connected to the standard capacitor arm and the arm in which the unknown reactive element is to be measured, zero balancing capacitor means connected from each junction associated with said zero balancing resistance means to the common bridge junction associated with the standard capacitor arm and the arm in which the unknown reactive element is to be measured, and means for balancing the resistance associated with the unknown reactive element without changing the capacitance associated with the other arms of said bridge, said means comprising a variable resistance network connected in parallel with the standard capacitor arm, said network including two output terminals, a variable uniformly distributed resistance having a movable contact arm mounted thereon and a conductive strap connected across the ends of said resistance element, the output terminals of said network being connected to said strap and said movable contact arm, respectively.

5. In an A.-C. measuring circuit, an A.-C. bridge including passive current impeding elements in at least two complementary arms of said bridge, means for energizing said bridge, means connected to said bridge for detecting a balanced condition, a calibrated, variable, standard reactance element and a pair of spaced terminals for measuring an unknown reactance element serially connected in two other complementary arms of said bridge, respectively, and a variable resistance network connected across said standard reactance element by a pair of output terminals for balancing out the value of resistance associated with said unknown reactive element to be measured, said network including a uniformly distributed resistance element, and means included in said network to maintain the distributed stray capacitance associated with said resistance element in said network substantially constant as the resistance thereof is varied, said last-mentioned means including a movable contact arm mounted on the resistance element, a short circuiting connection connected across the ends of said resistance element, and further including said output terminals connected to said strap and to said movable contact arm.

6. In an A.-C. measuring circuit, an A.-C. balancing bridge including current impeding elements in at least two complementary arms of said bridge, means for energizing said bridge, means connected to said bridge for detecting a voltage null condition, a calibrated, variable standard reactance element and a pair of spaced terminals for measuring an unknown reactance element respectively and serially connected in two other complementary arms of said bridge, and a variable conductance network including two output terminals connected across said standard reactance element for balancing out the value of conductance associated with the unknown reactive element to be measured, said network including at least two variable uniformly distributed conductance elements connected in parallel by a pair of conductors respectively connected to one of said output terminals and having movable contact arms respectively mounted thereon, said arms both being connected to one of said conductors, and further including:

means to maintain the distributed stray capacitance normally established across the output terminals of said variable conductance network substantially constant as the conductance thereof is varied, said last-mentioned means including means to move said two contact arms in predetermined directions relative to each other and by the same amount such that an increase in distributed stray capacitance associated with one of said conductance elements balances out the increase in distributed stray capacitance associated with the other of said conductance elements.

7. In an A.-C. bridge circuit which includes a pair of spaced test terminals in one arm for connection to an unknown reactive element to be measured, and which includes a variable standard reactance in another arm, a variable resistance network for balancing the resistance associated with the unknown reactive element without changing the reactance associated with the other arms of the bridge, which network comprises:

a uniformly distributed resistance element having a first stray capacitance in virtual parallelism therewith between the ends thereof;

a movable contact arm mounted on said element, said arm dividing said first stray capacitance into a second stray capacitance and a third stray capacitance, each being respectively in virtual connection between the ends of said element and said arm;

a short circuiting connection across the ends of said resistance element, said connection placing said second and said third stray capacitances in parallel with each other;

two output terminals connected respectively to said connection and to said arm, said second and said third stray capacitances being constantly additive thereacross; and means for connecting said output terminals across said standard reactance.

8. In an A.-C. bridge circuit which includes a pair of spaced test terminals in one arm for connection to an unknown reactive element to be measured, and which includes a variable standard reactance in another arm, a variable resistance network for balancing the resistance associated with the unknown reactive element without changing the reactance associated with the other arms of the bridge, which network comprises:

two identical uniformly distributed resistance elements, each having a movable contact arm mounted thereon and each having a first and a second end;

first means for connecting the first end of each of said resistance elements with the second end of the other of said resistance elements to form a parallel resistance network;

said pair of output terminals being connected respectively to said first connecting means;

second means for connecting both of said movable contact arms to one of said first connecting means;

means for moving said contact arms simultaneously in the same direction and by the same amount from the corresponding resistance centers of said resistance elements such that as the value of distributed stray capacitance and resistance associated with one of said resistance elements decrease and increase, respectively, across the output terminals, the distributed stray capacitance and resistance associated with the other of said resistance elements decrease and increase by the same amount, respectively.

References Cited by the Examiner

UNITED STATES PATENTS

| | | | |
|---|---|---|---|
| 1,733,585 | 10/1929 | Dehn | 324—62 X |
| 2,093,103 | 9/1937 | Taborsky | 323—75 X |
| 2,326,274 | 8/1943 | Young. | |
| 2,681,431 | 6/1954 | Wannamaker | 323—123 X |
| 2,813,183 | 11/1957 | Gearheart et al. | 338—133 |
| 2,850,604 | 9/1958 | Rowley | 323—79 X |
| 2,889,988 | 6/1959 | Toth et al. | 324—79 X |
| 2,911,588 | 11/1959 | Wetherhold | 324—34 |
| 3,068,466 | 12/1962 | Lindley | 324—94 X |
| 3,135,916 | 6/1964 | Tannenbaum | 324—60 |
| 3,205,431 | 9/1965 | Herrick | 323—94 |

FOREIGN PATENTS

| | | |
|---|---|---|
| 1,130,518 | 5/1962 | Germany. |
| 862,450 | 3/1961 | Great Britain. |

RUDOLPH V. ROLINEC, *Primary Examiner.*

FREDERICK M. STRADER, WALTER L. CARLSON, *Examiners.*

E. E. KUBASIEWICZ, *Assistant Examiner.*